United States Patent
Mori et al.

(10) Patent No.: US 7,924,928 B2
(45) Date of Patent: Apr. 12, 2011

(54) MOVING PICTURE DECODING APPARATUS AND PICTURE BOUNDARY DECIDING METHOD

(75) Inventors: Hirofumi Mori, Koganei (JP); Tatsunori Saito, Sagamihara (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1413 days.

(21) Appl. No.: 11/393,548

(22) Filed: Mar. 30, 2006

(65) Prior Publication Data

US 2006/0227872 A1 Oct. 12, 2006

(30) Foreign Application Priority Data

Apr. 11, 2005 (JP) .................. 2005-113824

(51) Int. Cl.
*H04N 7/12* (2006.01)
(52) U.S. Cl. ......... 375/240.26; 375/240.13; 375/240.14; 375/240.15; 375/240.16; 375/240.21; 375/240.24
(58) Field of Classification Search ........... 375/240.13–240.16, 240.21, 240.24, 375/240.26
See application file for complete search history.

(56) References Cited

U.S. PATENT DOCUMENTS 5,623,308 A * 4/1997 Civanlar et al. .......... 375/240.01
6,970,938 B2 * 11/2005 Sugiyama et al. ............ 709/231

OTHER PUBLICATIONS

"ARIB TR-B14, Terrestrial Digital Television Broadcasting Application Rule Technical Material", Association of Radio Industries and Businesses, 2004.
"ARIB TR-B13, Terrestrial Digital Voice Broadcasting Application Rule Technical Material", Association of Radio Industries and Businesses, 2004.
"The error concealment feature in the H. 26L test model,"Proc. ICIP, vol. 2, pp. 729 to 732, Sep. 2002.
"Non-normative error concealment algorithms,"ITU-T VCEG-N62, Sep. 2001.
"Investigation related to Reproduced Image in Error Environment in H. 264" Technical Report of IEICE, IE May 18, 2004.
H.264/AVC Textbook. Kabushiki Kaisha in press. Aug. 11, 2004. pp. 100-101.
Japanese Office Action (and English translation thereof) dated Aug. 19, 2008, issued in a counterpart Japanese Application.

* cited by examiner

*Primary Examiner* — Tung Vo
*Assistant Examiner* — Anner Holder
(74) *Attorney, Agent, or Firm* — Maschoff Gilmore & Israelsen

(57) ABSTRACT

A moving picture decoding apparatus which receives stream data in time series and decodes a moving picture included in the stream data, includes a deciding unit which decides a slice picture boundary of a picture of the moving picture, and a decoding unit which decodes the picture based on a result of the decision of the deciding unit, wherein the deciding unit decides that a slice picture and a just before slice picture are different from each other when an increment of frame_num of the slice picture is 1.

15 Claims, 7 Drawing Sheets

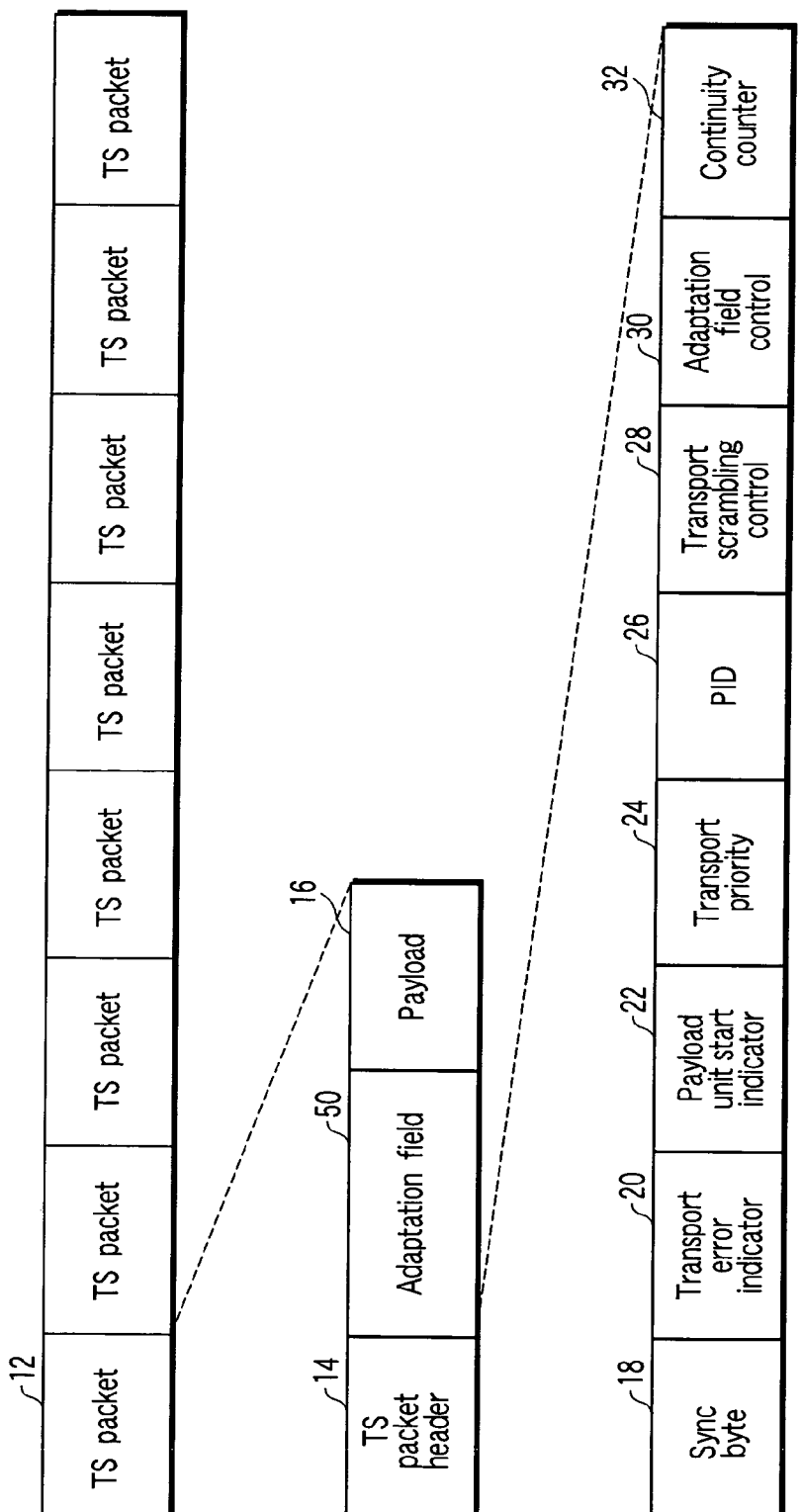
F I G. 2A
F I G. 2B
F I G. 2C

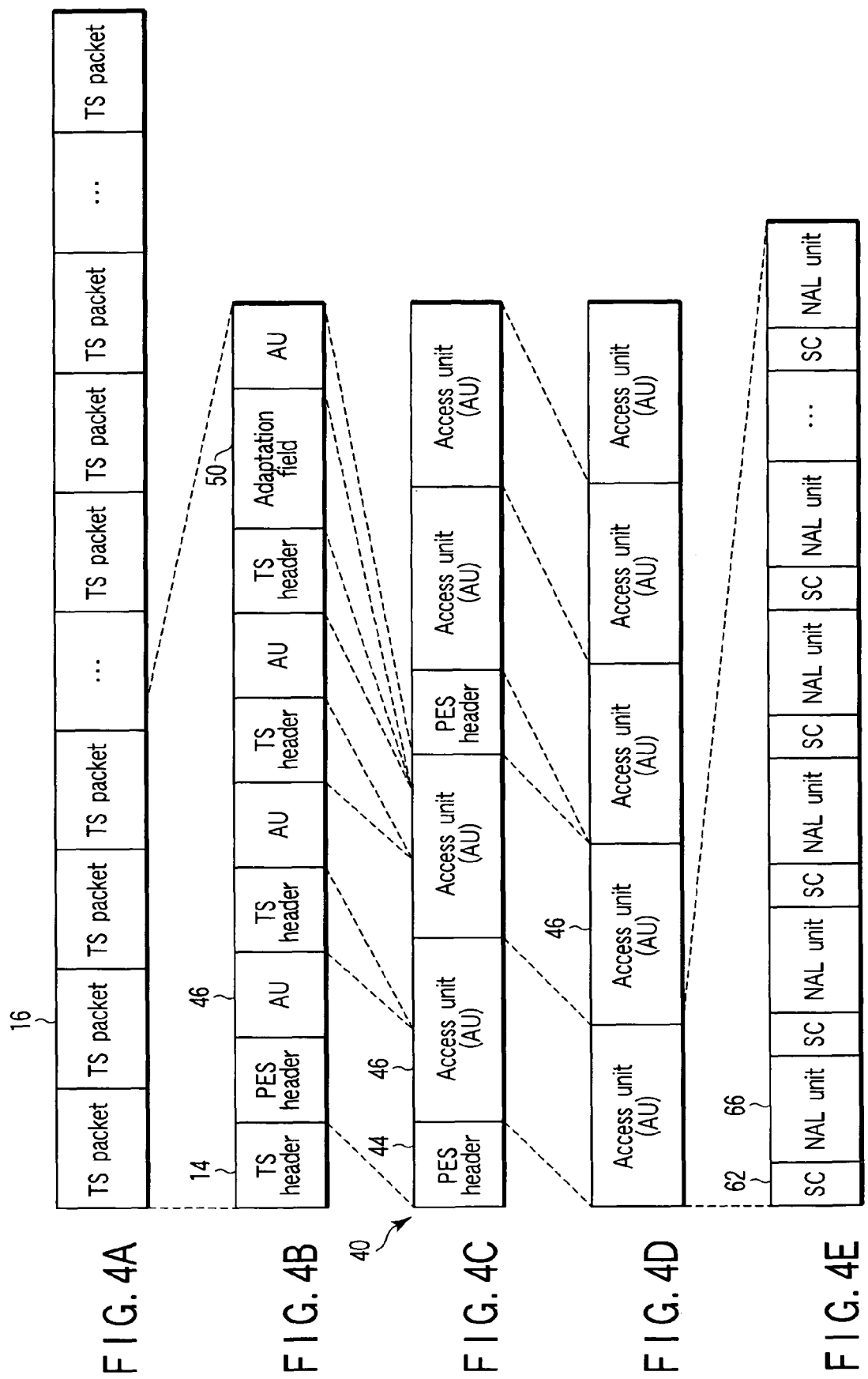

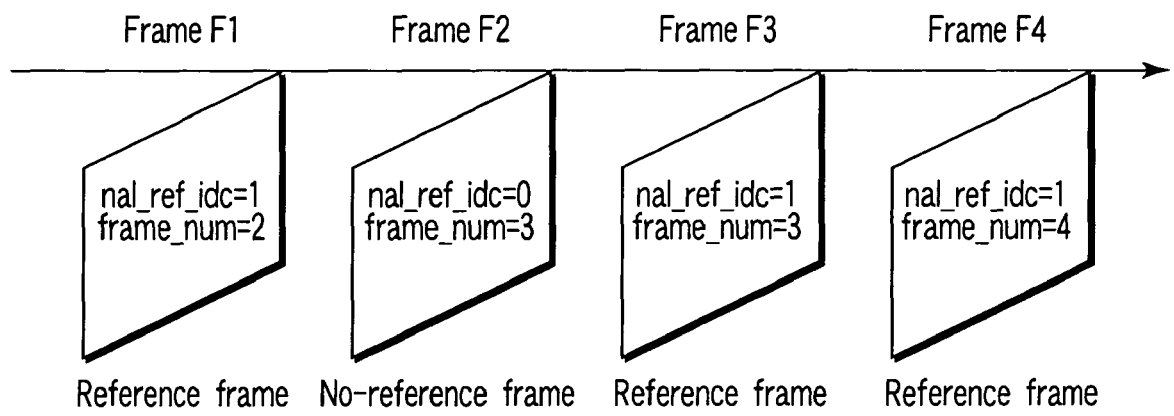
F I G. 7

MOVING PICTURE DECODING APPARATUS AND PICTURE BOUNDARY DECIDING METHOD

CROSS-REFERENCE TO RELATED APPLICATIONS

This application is based upon and claims the benefit of priority from prior Japanese Patent Application No. 2005-113824, filed Apr. 11, 2005, the entire contents of which are incorporated herein by reference.

BACKGROUND OF THE INVENTION

1. Field of the Invention

The present invention relates to a moving picture decoding apparatus and a picture boundary deciding method.

2. Description of the Related Art

A method of coding a moving picture includes MPEG-4 and H. 264/MPEG-4 AVC obtained by developing the MPEG-4 (which will be hereinafter referred to as "H. 264". "See Draft ITU-T Recommendation and Final Draft International Standard of Joint Video Specification (ITU-T Rec. H. 264|ISO/IEC 14496-10 AVC), "in Joint Video Team of ISO/IEC MPEG and ITU-T VCEG, May 2003). The H. 264 is a moving picture coding method employed for a terrestrial digital broadcast (see "ARIB TR-B14, Terrestrial Digital Television Broadcasting Application Rule Technical Material", Association of Radio Industries and Businesses, 2004 and "ARIB TR-B13", Terrestrial Digital Voice Broadcasting Application Rule Technical Material", Association of Radio Industries and Businesses, 2004), 3GPP, HD-DVD and the like. Referring to a mobile terrestrial digital broadcast, application rules are created based on the ARIB (see "ARIB TR-B14, Terrestrial Digital Television Broadcasting Application Rule Technical Material" Association of Radio Industries and Businesses, 2004) and a service will be started at the end of 2005. Referring to a mobile broadcast which has already been serviced, similarly, a transition from the MPEG-4 to the H. 264 has been investigated as a moving picture coding method.

In the broadcasting application of the H. 264, an H. 264 stream is multiplexed to MPEG-2 systems (see ISO/IEC 13818-1) together with information such as a voice and data broadcast and the like and is transmitted to a receiving terminal. In a radio distribution for a moving picture utilizing an IP network or the like, moreover, the H. 264 stream is multiplexed by RTP (Real-time Transport Protocol). However, since the receiving terminal is moved, the stream cannot be expected to be always received in a stable radio environment. In an environment in which the receiving terminal is hidden by a building or the like, particularly, an error is mixed into the stream very often. Accordingly, an error resistant function is indispensable to a decoder to be used in an error environment. Since an error resistant processing in the H. 264 is nonstandard, however, a behavior thereof is varied depending on a decoder and various proposals have been given (see Y.-K. Wang, M. M. Hannuksela, V. Varsa, A. Hourunranta, and M. Gabbouj, "The error concealment feature in the H.26L test model, "Proc. ICIP, vol. 2, pp. 729 to 732, September 2002., V. Varsa, M. M. Hannuksela, and Y.-K. Wang, "Non-normative error concealment algorithms, "ITU-T VCEG-N62, September 2001. and Hirofumi Mori, Hirokazu Kawakatsu, Masakazu Suzuki, "Investigation related to Reproduced Image in Error Environment in H. 264" Technical Report of IEICE, IE 2004-18, May. 2004).

On the other hand, in the H. 264, a syntax to be used for deciding a slice picture boundary (hereinafter referred to as a "picture boundary" in this specification) is present in all slice pictures. For this reason, there is a problem in that the syntax is damaged by an error. When the error is mixed into the syntax, therefore, the picture boundary is decided erroneously. Consequently, the number of pictures to be decoded is increased or decreased. Thus, there is a problem in that a mismatch of a reference frame, an overflow of a decoder buffer, an increase in a throughput, and the like are caused.

BRIEF SUMMARY OF THE INVENTION

It is an object of the present invention to provide a moving picture decoding apparatus and a picture boundary deciding method which can suppress an increase in the number of pictures due to a mixture of an error.

According to one aspect of the present invention, there is provided a moving picture decoding apparatus which receives stream data in time series and decodes a moving picture included in the stream data, comprising: decision unit for deciding a slice picture boundary of a picture of the moving picture; and decoder for decoding the picture based on a result of the decision of the decision unit, wherein the decision unit decides that a slice picture and a just before slice picture are different from each other when an increment of frame_num of the slice picture is 1. The present invention is not restricted to the apparatus but can also be established as the invention of a method of implementing a function to be realized by the apparatus or a program.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 2A to 2C are typical diagrams showing a data structure of the transport stream (TS) to be transmitted to the apparatus illustrated in FIG. 1;

FIGS. 4A to 4E are typical diagrams showing a relationship among the transport stream illustrated in FIGS. 2A to 2C, the packetalized elementary stream (PES) illustrated in FIGS. 3A to 3G, and a byte stream of H. 264;

FIG. 7 is a diagram for explaining nal_ref_idc.

DETAILED DESCRIPTION OF THE INVENTION

An embodiment of the present invention will be described with reference to the drawings.

Figure 1:
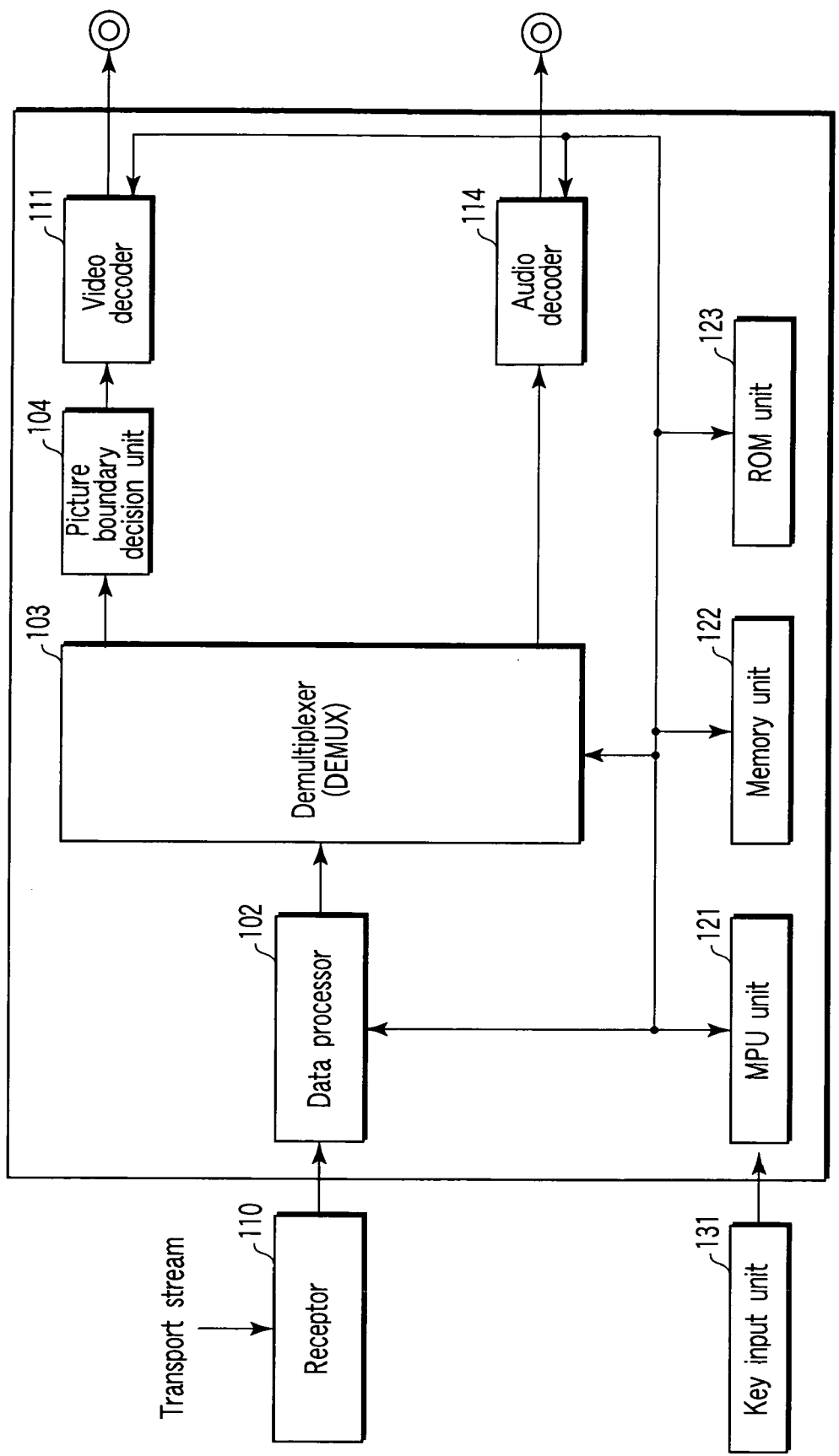
FIG. 1 is a block diagram schematically showing a reproducing apparatus for receiving and decoding a transport stream according to an embodiment of the present invention.

FIG. 1 is a block diagram showing an apparatus for receiving a transport stream and reproducing video data and audio data which are transmitted through the transport stream (TS) according to the embodiment of the present invention. FIGS. 2A to 2C show a structure of the transport stream received by the apparatus illustrated in FIG. 1, and FIGS. 3A to 3G show a structure of a packetalized elementary stream (PES) constituted by a TS packet fetched from the transport stream illustrated in FIGS. 2A to 2C. Moreover, FIGS. 4A to 4E show a relationship among the TS packet illustrated in FIG. 2A, the PES packet illustrated in FIGS. 3A to 3G, and a byte stream defined by H. 264/AVC.

A structure of a receiver will be described with reference to FIG. 1 and a data structure of the transport stream will be described with reference to FIGS. 2A to 4E.

In FIG. 1, a receiver 110 receives a transport stream defined by MPEG2 which is transmitted from a transmitter (not shown). The transport stream (TS) is constituted by a group of TS packets 12, each of which has 188 bytes as shown in FIG. 2A. The TS packet 12 is input to the receiver 110 in time series. Each of the TS packets 12 is constituted by a TS packet header 14 having 4 bytes, an adaptation field 50 having a variable-length byte of 0 to 184, and TS packet data (payload) 16 having residual data as shown in FIG. 2B. The TS packet 12 is transmitted to a data processor 102 shown in FIG. 1. The TS packet header 14 is fetched by the data processor 102 and a packetalized elementary stream (PES) is constituted by the TS packet data (payload) 16.

As shown in FIG. 2C, the TS packet header 14 describes a sync byte 18 describing an 8-bit synchronizing signal as defined by the MPEG2, a transport error indicator 20 indicative of the presence of a bit error in the packet, and a payload unit start indicator 22 indicating that the PES packet shown in FIG. 4C starts from the payload implying the TS packet data 16. The sync byte 18 is detected by the data processor 102 so that the head of the transport stream packet (TS) 12 is detected. Moreover, the payload unit start indicator 22 is detected so that the data processor 102 can fetch a payload constituting the PES packet, that is, the TS packet data 16. Furthermore, the transport error indicator 20 is detected so that it is possible to detect, on the receiving side, that an error is mixed into the transport stream packet (TS) 16 during a transmission.

Moreover, the TS packet header 14 is constituted by a transport priority 24 indicative of a degree of importance of the packet, a PID (Packet Identification) 26 indicative of an attribute of an individual stream of the packet, a transport scrambling control 28 indicative of the presence or type of the scrambling of the packet, an adaptation field control 30 indicative of the presence of an adaptation field and that of a payload, and a continuity counter 32 indicative of information which serves to detect whether a packet having the same PID is partially rejected during the transmission. The data processor 102 can detect whether the payload of the TS packet 12, that is, the TS packet data are video or audio through the PID (Packet Identification) 26 and can also specify the attribute of the PES packet constituted by the TS packet 12. The data processor 102 can verify a count value indicated by the continuity counter 32, thereby deciding whether the TS packet 12 is lost during the transmission or not as will be described below in detail. Referring to the TS packet 12 having the same PID, a count value (0, 1, 2, ..., F, 0, 1, 2) circulated in order of the generation of the TS packet is attached to the continuity counter 32.

Figure 3A:
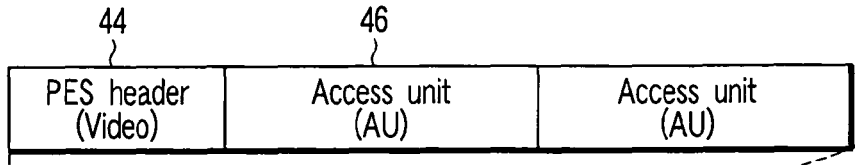
FIGS. 3A to 3G are typical diagrams showing a structure of a packetalized elementary stream (PES) generated from a packet of the transport stream illustrated in FIGS. 2A to 2C.
Figure 3B:
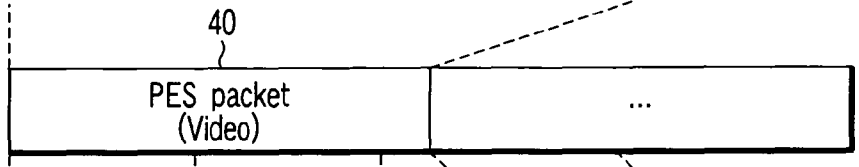
Figure 3C:
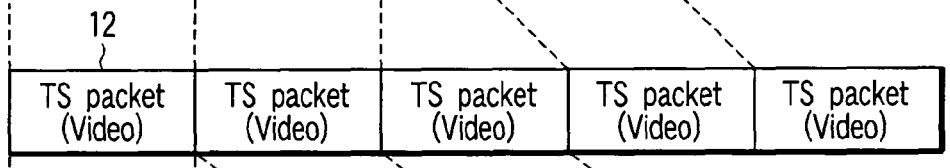
Figure 3D:
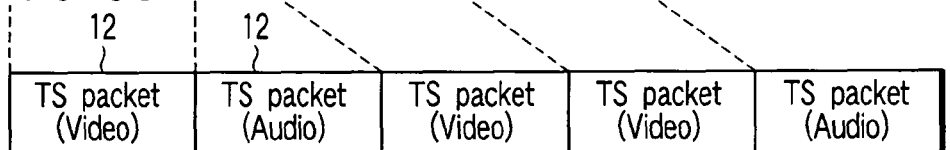
Figure 3E:
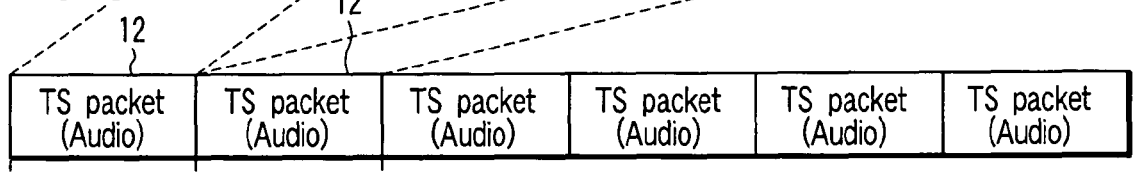
Figure 3F:
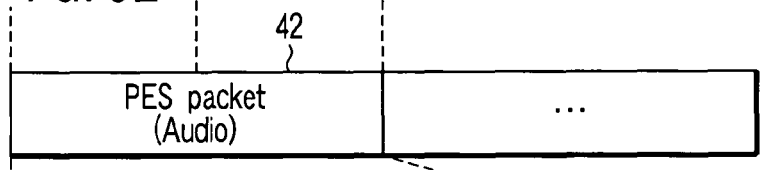
Figure 3G:
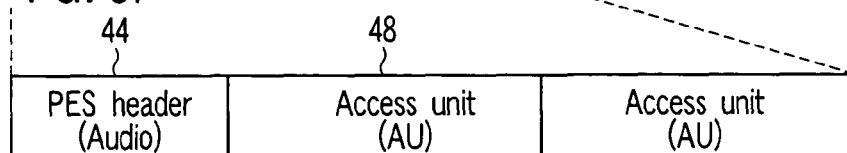

The TS packet data (payload) 16 shown in FIG. 2B constitute a packetalized elementary stream (PES) for each medium as shown in FIG. 3B or FIG. 3F, and constitute PES packets 40 and 42 shown in FIG. 3B every time the payload unit start indicator 22 is detected. More specifically, the PES packets 40 and 42 are constituted by one or more TS packet 16, and the packetalized elementary stream (PES) is constituted by the arrangement of PES packets 40 in time series so that the plurality of PES packets 40 and 42 are constituted from the TS packet 12 including the payload unit start indicator 22 to the TS packet 12 prior to the TS packet 12 including the next payload unit start indicator 22. Moreover, the packetalized elementary stream (PES) is constituted by multiplexing the PES packet 40 having a payload of video data and the PES packet 42 having a payload of audio data. The data processor 102 supplies, to demultiplexer (DEMUX) 103, the PES packet 40 for video and the PES packet 42 for audio which are constituted by the TS packet data 16 in accordance with the payload unit start indicator 22. The PES packets 40 and 42 are determined to have variable-length bytes.

As shown in FIG. 3A, the PES packet 40 for video is constituted by one or more access unit (hereinafter referred to as an "AU") as a payload after the PES header 44, and the access unit (AU) 44 constitutes a byte stream defined by H. 264, MPEG-2, MPEG-4 or the like. Moreover, the PES packet 42 for audio is constituted by the audio payload after the PES header 44 in the same manner. The audio payload stores audio data coded by various coding methods, for example, AC3 audio data, PCM audio data and MPEG audio. The PES header 44 describes a stream ID to be an attribute identifier indicating that the payload of the PES packet 40 is audio or video, and the PES packet 40 can be decided.

The demultiplexer (DEMUX) 103 supplies the audio payload to the audio decoder 114 based on the PDI (Packet Identification) 26, and supplies the access unit (AU) 44 to the H. 264 video decoder 111 through the picture boundary deciding unit 104 which will be described below. Accordingly, the H. 264 video decoder 111 decodes NALs in the access unit (AU) 44 into a picture by setting the access unit (AU) 44 to be a unit, thereby outputting a video signal for each frame. In the audio decoder 114, similarly, the audio payload is decoded and is output as an audio signal in accordance with the audio payload coding method.

The data processor 102, the demultiplexer 103, the video decoder 111 and the audio decoder 114 shown in FIG. 1 are controlled by the MPU 121 and the memory 122 in accordance with a processing program stored in an ROM 123. Moreover, a key input unit 131 to be a user interface is connected to the MPU 121 and the reproduction of video and audio can be controlled in accordance with an input from the key input unit 131.

As described above, the transport stream TS is constituted by the continuous TS packets 16 as shown in FIG. 4A and each packet 40 is constituted by the TS header 14 and the TS payload 16 as shown in FIG. 4B. One or more TS packet 16 constituting the PES packet 40 stores the PES header 44 and a plurality of AUs 46 in the payload as shown in FIG. 4B. One PES packet 40 is constituted by one or more TS packet 16 having 188 bytes, and furthermore, an adaptation field 50 is provided to carry out a data alignment if necessary in order to include one or more AU 46.

In the data processor 102, the TS header 14 is removed from one or more TS packet 16 as shown in FIG. 4C so that the PES packet 40 is constituted. In the example of FIG. 4C, two AUs 46 are stored in the payload 46 of the PES packet 40 and are fetched from the four TS packets 16. The adaptation field 50 is inserted for the data alignment of the TS packet 16 and is thus discarded when the PES packet 40 is to be constituted.

In the demultiplexer 103, the PES header 44 is removed from the PES packet 40 and the AU 46 is successively transmitted to the video decoder 111 and decoded. FIG. 4D shows a byte stream constituted by the AU 46 which is fetched from the PES packet 40 and is decoded by the video decoder 111. In the video decoder portion 111, as shown in FIG. 4E, a start code (SC) 62 to be a synchronizing point in the AU is detected and a NALunit 66 constituting the AU 46 is fetched to generate a picture constituted on a unit of the AU 46 from the NALunit 66, for example, a picture frame. In the H. 264, a slice picture is constituted in accordance with the information of the NALunits 66 so that one picture is displayed.

Since the syntax for use in the decision of the picture boundary is present in all of the slice pictures as described above, it is damaged by an error.

Figure 5A:
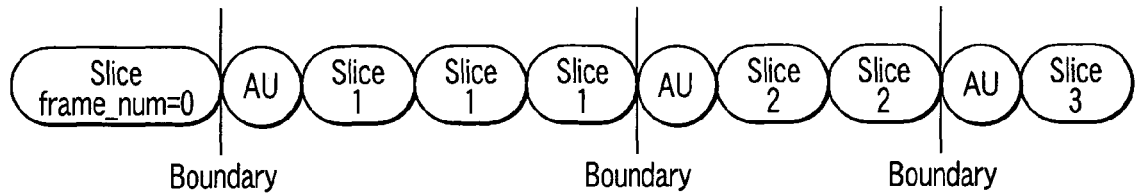
FIGS. 5A to 5D are diagrams showing an example of the detection of a picture boundary in a normal stream and a stream having an error mixed therein.
Figure 5B:
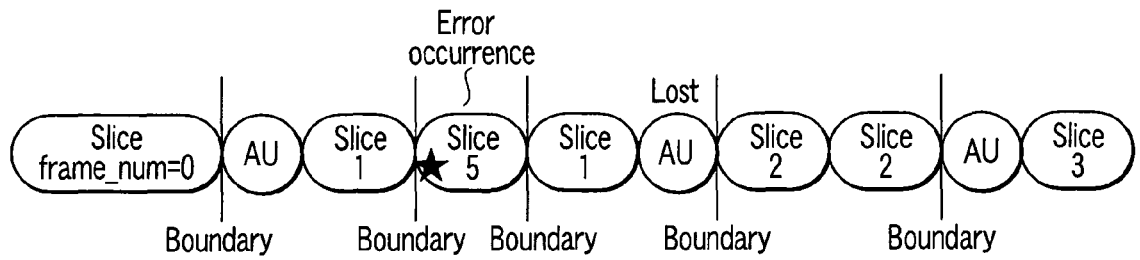

FIG. 5A is a diagram showing an example of the detection of a picture boundary in a normal stream. In FIGS. 5A to 5D, Slice represents a slice and AU represents an AU delimiter. The AU in the H. 264 is constituted by one or more slice picture having the same frame_num. Therefore, it is possible to detect the picture boundary from a changing point of frame_num. Moreover, it is also possible to detect the picture boundary from the presence of the AU delimiter. More specifically, the boundary between the slice picture and the AU is detected as the picture boundary. By taking, as an example, the case in which an error is mixed into a second one of three slice pictures 1, and frame_num is detected to be 5 and the AU between the slice picture 1 and a slice picture 2 is defective as shown in FIG. 5B, however, it is decided that the picture boundary is detected because frame_num is varied for the defect of the AU therebefore and thereafter. When such an error as to recognize a slice picture of frame_num to be 1 as a slice picture of frame_num to be 5 is mixed, however, frame_num is discontinuous before and after the slice picture of frame_num to be 5. Consequently, the slice picture is erroneously recognized as three slice pictures including the slice picture 1, a slice picture 5 and the slice picture 1. Since the picture boundary processing of the H. 264 detects a boundary from a syntax having several bits differently from the MPEG-4 indicative of a boundary through a 4-byte unique code, it is easily influenced by a bit error so that the number of decoded pictures tends to be increased.

Figure 5C:
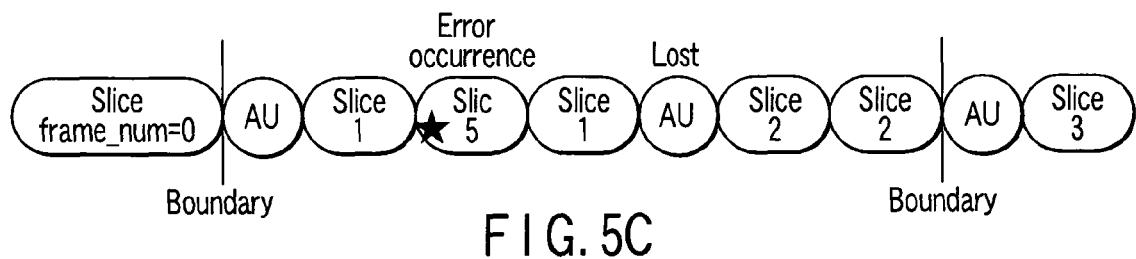

On the other hand, in a terrestrial digital broadcast, the application of the AU delimiter representing the picture boundary is essential. By utilizing the fact, therefore, the detection of the picture boundary through the AU delimiter can also be proposed. However, an erroneous decision can be prevented from being caused by a bit error such as frame_num in this method. In this case, if the picture boundary is simply detected by only the AU delimiter, there is a problem in that the number of the slice pictures is decreased every time the AU delimiter is caused to be defective due to an error as shown in FIG. 5C.

Figure 5D:
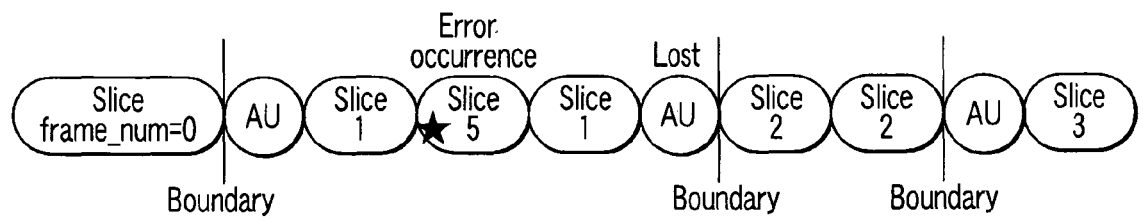

In the present invention, therefore, a picture boundary decision unit 104 is newly provided as shown in FIG. 1, thereby deciding the picture boundary depending on the following algorithm. As shown in FIG. 5D, consequently, it is possible to accurately decide a slice picture boundary.

In the H. 264, if the syntax included in Slice Header satisfies any of seven types of conditions, it is decided to be the picture boundary. In the terrestrial digital broadcast, moreover, Baseline Profile is employed. Therefore, it is preferable to confirm the following three conditions.

(1) frame_num differs in value.
(2) nal_ref_idc differs in value with one of the nal_ref_idc values being equal to 0.
(3) idr_pic_id differs in value.

The condition (2) is a boundary deciding condition between a no-reference picture and a reference picture, and the condition (3) is a boundary deciding condition between continuous IDRs. In a normal stream, therefore, it is possible to detect a boundary on the condition (1).

Figure 6:
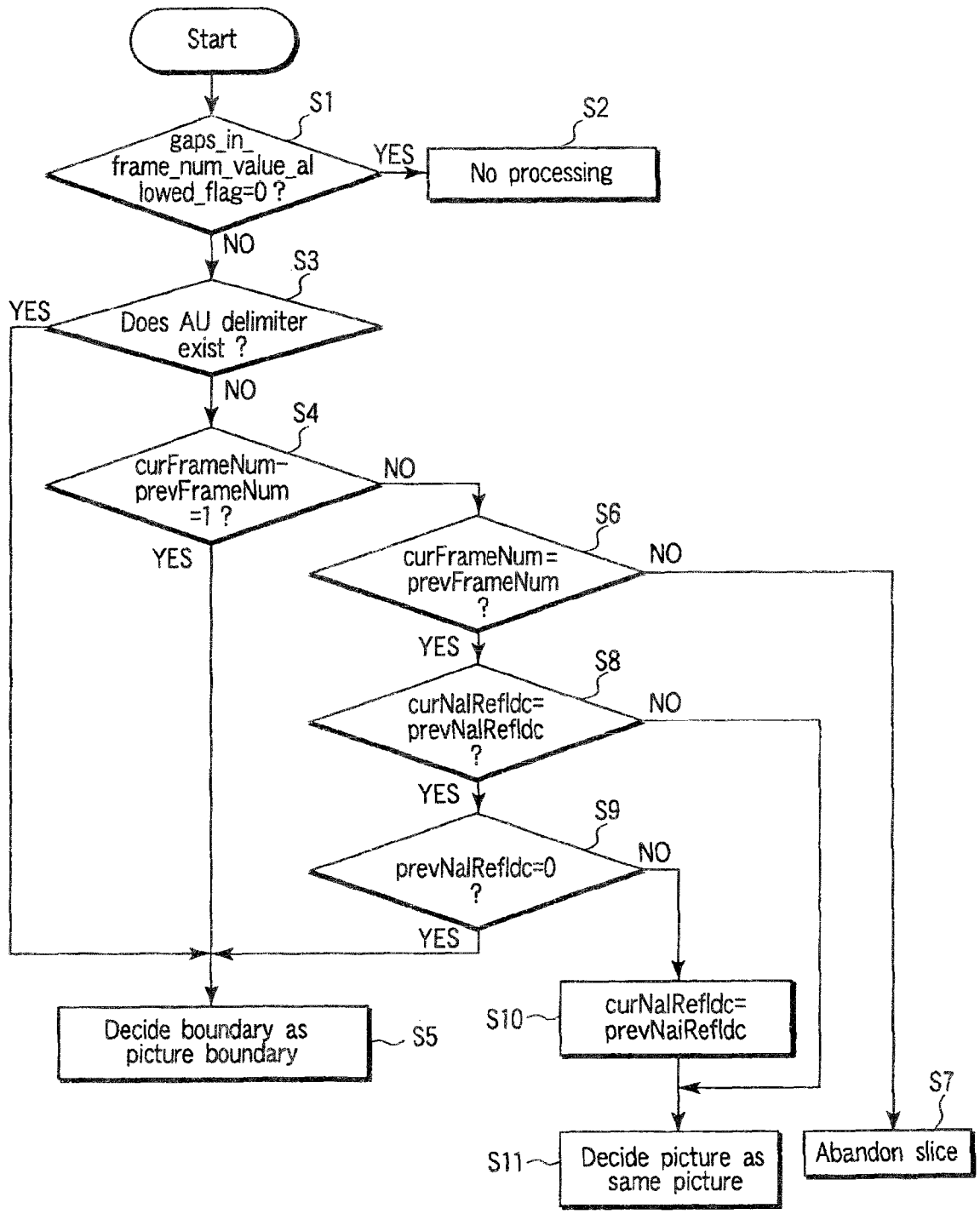
FIG. 6 is a flowchart showing a processing flow of a picture deciding method according to the present invention.

In the embodiment according to the present invention, the application of the condition (1) is switched depending on the presence of the AU delimiter insertion in order to solve the problems. With reference to FIG. 6, a specific processing flow will be described. It is assumed that all of the processings in FIG. 6 are carried out by the picture boundary decision unit 104.

First of all, it is decided whether gaps_in_frame_num_value_allowed_flag is 0 or not (that is, an increment of frame_num is 0 or 1 (Step S1). In the terrestrial digital broadcast, frame_num is incremented by 1 from 0 with IDR set to be a starting point. If gaps_in_frame_num_value_allowed_flag is 0 (Yes in the Step S1), accordingly, the increment is normal so that the processing ends without the execution of a special processing (Step S2).

Next, it is decided whether the AU delimiter is detected (Step S3). If the AU delimiter is detected (Yes in the Step S3), the same portion is set to be a picture boundary (Step S5). If the AU delimiter is not detected in the Step S3 (No in the Step S3), a difference between curFrameNum to be current frame_num and prevFrameNum to be previous frame_num is taken (Step S4). If the difference between curFrameNum and prevFrameNum is 1 in the Step S4 (Yes in the Step S4), a boundary between curFrameNum and prevFrameNum is decided to be a picture boundary (Step S5). If the difference between curFrameNum and prevFrameNum is not 1 in the Step S4, it is decided whether curFrameNum and prevFrameNum are equal to each other (Step S6). If curFrameNum and prevFrameNum are not equal to each other in the Step S6 (No in the Step S6), it is decided that a current slice picture includes an error and the slice picture is discarded (Step S7).

If curFrameNum and prevFrameNum are equal to each other in the Step S6 (Yes in the Step S6), it is decided whether current curNalRefIdc and prevNalRefIdc are equal to each other or not (Step S8).

With reference to FIG. 7, nal_ref_idc will be described briefly.

nal_ref_idc in the slice represents that reference is made to a decoded picture or not, and a picture constituted by a slice in which nal_ref_idc is 0 is not used as the reference picture. On the other hand, only a picture constituted by a slice in which nal_ref_idc is not 0 is used as the reference picture.

In frames F1, F2, F3 and F4 in FIG. 7, the frames F1, F3 and F4 represent the reference pictures because $nal_{13}$ ref_idc is 1, and the frame F2 represents the non-reference picture because nal_ref_idc is 0.

When the frame F3 is to be decoded, the frame F2 is decoded as a non-reference picture. For this reason, the frame F2 is removed from a predicting object frame and a moving compensation is carried out by using the decoded frame before the frame F1.

In the decision of the picture boundary in the non-reference picture, the boundary between the frames F2 and F3 holding the same frame_num is detected from a change of nal_ref_idc from 0 to 1.

On the other hand, in the frames holding the same frame_num, nal_ref_idc is prohibited from being changed from 1 to 0.

If prevNalRefIdc is 0 in the Step S9 (Yes in the Step S9), it is decided to be a picture boundary. If not so, curNalRefIdc represents a different value from prevNalRefIdc due to an error to set curNalRefIdc=prevNalRefIdc (Step S10) and a current picture and a just before picture are decided to be the same picture (Step S11).

As described above, if the increment of continuous frame_num is neither 0 nor 1, the slice picture is treated as an error. In order to correspond to the case in which the error is made very often, (if the AU delimiter is present), the picture boundary is decided irrespective of the increment of frame_num. Even if an error occurrence in the frame_num or no Au delimiter is caused as shown in FIGS. 5A to 5D, consequently, it is possible to detect a picture boundary as expected. In order to execute the processing, it is preferable that the picture boundary decision unit 104 should comprise a storage unit having a small capacity for storing header data on a just before slice picture, for example, an RAM or the like.

Moreover, the transport stream to be a target is a multiplexing stream including H. 264 such as RTP in addition to MPEG-2 systems.

The present invention is not restricted to the embodiment but various changes can be made without departing from the scope thereof in an executing stage. For example, in case of the terrestrial digital broadcast, SPS/PPS/SEI may be used in place of the AU delimiter. Furthermore, the embodiment includes the invention in various stages and various inventions can be extracted by a proper combination in a plurality of components which is disclosed.

According to the present invention, it is possible to suppress an increase in the number of pictures due to an error occurrence.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A moving picture decoding apparatus for receiving stream data which includes slice pictures and for decoding the slice pictures to reproduce a moving picture, wherein the slice pictures include, as attribute information, a delimiter indicating a picture boundary, and frame number control information indicating whether an increment in frame_num is limited to 0 or 1, the apparatus comprising:
   a first decision unit which decides whether the delimiter exists, and which decides that a position of the delimiter is the picture boundary when it is decided that the delimiter exists;
   a second decision unit which decides whether an increment in frame_num is 1 or more than 1, when the first decision unit decides that no delimiter exists, and which decides that a boundary between a current slice picture and a preceding slice picture is the picture boundary, when deciding that the increment in frame_num is 1; and
   a controller which discards the current slice picture when the first decision unit decides that no delimiter exists, and the second decision unit decides that the increment in frame_num is more than 1.

2. The moving picture decoding apparatus according to claim 1, further comprising a third decision unit which decides whether data items nal_ref_idc added to the current and preceding slice pictures differ from each other, when the second decision unit decides that the increment in fram_num is 0, and which decides that the boundary between the current slice picture and the preceding slice picture is the picture boundary, when deciding that the data items nal_ref_idc differ from each other, wherein the data items nal_ref_idc indicate whether each of the current and preceding slice pictures should be used as a reference picture.

3. The moving picture decoding apparatus according to claim 2, wherein when deciding that the data items nal_ref_idc differ from each other, the third decision unit further decides whether the data item nal_ref_idc added to the preceding slice picture is 0, and decides that the boundary between the current slice picture and the preceding slice picture is the picture boundary, when deciding that the data item nal_ref_idc added to the preceding slice picture is 0.

4. The moving picture decoding apparatus according to claim 1, further comprising a third decision unit which decides whether data items nal_ref_idc added to the current and preceding slice pictures differ from each other, when the second decision unit decides that the increment in frame_num is 0, and which decides that the boundary between the current slice picture and the preceding slice picture is the picture boundary, when deciding that the data items nal_ref_idc differ from each other and the data item nal_ref_idc added to the preceding slice picture is 0, wherein the data items nal_ref_idc indicate whether each of the current and preceding slice pictures should be used as a reference picture.

5. The moving picture decoding apparatus according to claim 1, further comprising a third decision unit which decides whether data items nal_ref_idc added to the current and preceding slice pictures differ from each other, when the second decision unit decides that the increment in frame_num is 0, and which sets the data item nal_ref_idc added to the current slice picture to a same value as the data item nal_ref_idc added to the preceding slice picture, when deciding that the data items nal_ref_idc differ from each other and the data item nal_ref_idc added to the preceding slice picture is not 0, wherein the data items nal_ref_idc indicate whether each of the current and preceding slice pictures should be used as a reference picture.

6. A moving picture decoding method for a moving picture decoding apparatus which receives stream data including slice pictures and which decodes the slice pictures to reproduce a moving picture, wherein the slice pictures include, as attribute information, a delimiter indicating a picture boundary, and frame_number control information indicating whether an increment in frame_num is limited to 0 or 1, the method comprising:
   deciding whether the delimiter exists, and deciding that a position of the delimiter is the picture boundary when it is decided that the delimiter exists;
   deciding whether an increment in frame_num is 1 or more than 1, when it is decided that no delimiter exists, and deciding that a boundary between a current slice picture and a preceding slice picture is the picture boundary, when deciding that the increment in frame_num is 1; and
   discarding the current slice picture when it is decided that no delimiter exists, and that the increment in frame_num is more than 1.

7. The moving picture decoding method according to claim 6, further comprising deciding whether data items nal_ref_idc added to the current and preceding slice pictures differ from each other, when it is decided that the increment in fram_num is 0, and deciding that the boundary between the current slice picture and the preceding slice picture is the picture boundary, when it is decided that the data items nal_ref_idc differ from each other, wherein the data items nal_ref_idc indicate whether each of the current and preceding slice pictures should be used as a reference picture.

8. The moving picture decoding method according to claim 7, wherein when deciding whether the data items nal_ref_idc differ from each other, it is further decided whether the data item nal_ref_idc added to the preceding slice picture is 0, and it is decided that the boundary between the current slice picture and the preceding slice picture is the picture boundary, when it is decided that the data item nal_ref_idc added to the preceding slice picture is 0.

9. The moving picture decoding method according to claim 6, further comprising deciding whether data items nal_ref_idc added to the current and preceding slice pictures differ from each other, when it is decided that the increment in frame_num is 0, and deciding that the boundary between the current slice picture and the preceding slice picture is the picture boundary, when it is decided that the data items nal_ref_idc differ from each other and the data item nal_ref_idc added to the preceding slice picture is 0, wherein the data items nal_ref_idc indicate whether each of the current and preceding slice pictures should be used as a reference picture.

10. The moving picture decoding method according to claim 6, further comprising deciding whether data items nal_ref_idc added to the current and preceding slice pictures differ from each other, when it is decided that the increment in frame_num is 0, and setting the data item nal_ref_idc added to the current slice picture to a same value as the data item nal_ref_idc added to the preceding slice picture, when deciding that the data items nal_ref_idc differ from each other and the data item nal_ref_idc added to the preceding slice picture is not 0, wherein the data items nal_ref_idc indicate whether each of the current and preceding slice pictures should be used as a reference picture.

11. A moving picture decoding apparatus for receiving stream data which includes slice pictures and for decoding the slice pictures to reproduce a moving picture, wherein the slice pictures include, as attribute information, a delimiter indicating a picture boundary, and frame_number control information indicating whether an increment in frame_num is limited to 0 or 1, the apparatus comprising:
first decision means for deciding whether the delimiter exists, and for deciding that a position of the delimiter is the picture boundary when it is decided that the delimiter exists;
second decision means for deciding whether an increment in frame_num is 1 or more than 1, when the first decision means decides that no delimiter exists, and for deciding that a boundary between a current slice picture and a preceding slice picture is the picture boundary, when deciding that the increment in frame_num is 1; and
control means for discarding the current slice picture when the first decision means decides that no delimiter exists, and the second decision means decides that the increment in frame_num is more than 1.

12. The moving picture decoding apparatus according to claim 11, further comprising third decision means for deciding whether data items nal_ref_idc added to the current and preceding slice pictures differ from each other, when the second decision means decides that the increment in fram num is 0, and for deciding that the boundary between the current slice picture and the preceding slice picture is the picture boundary, when deciding that the data items nal_ref_idc differ from each other, wherein the data items nal_ref_idc indicate whether each of the current and preceding slice pictures should be used as a reference picture.

13. The moving picture decoding apparatus according to claim 12, wherein when deciding the data items nal_ref_idc differ from each other, the third decision means further decides whether the data item nal_ref_idc added to the preceding slice picture is 0, and decides that the boundary between the current slice picture and the preceding slice picture is the picture boundary, when deciding that the data item nal_ref_idc added to the preceding slice picture is 0.

14. The moving picture decoding apparatus according to claim 11, further comprising third decision means for deciding whether data items nal_ref_idc added to the current and preceding slice pictures differ from each other, when the second decision means decides that the increment in frame_num is 0, and for deciding that the boundary between the current slice picture and the preceding slice picture is the picture boundary, when deciding that the data items nal_ref_idc differ from each other and the data item nal_ref_idc added to the preceding slice picture is 0, wherein the data items nal_ref_idc indicate whether each of the current and preceding slice pictures should be used as a reference picture.

15. The moving picture decoding apparatus according to claim 11, further comprising third decision means for deciding whether data items nal_ref_idc added to the current and preceding slice pictures differ from each other, when the second decision means decides that the increment in frame_num is 0, and for setting the data item nal_ref_idc added to the current slice picture to a same value as the data item nal_ref_idc added to the preceding slice picture, when deciding that the data items nal_ref_idc differ from each other and the data item nal_ref_idc added to the preceding slice picture is not 0, wherein the data items nal_ref_idc indicate whether each of the current and preceding slice pictures should be used as a reference picture.

\* \* \* \* \*